Sept. 24, 1940. H. SCHERBAK 2,216,102
MASTER INSTRUMENT
Original Filed Nov. 10, 1936 2 Sheets-Sheet 1
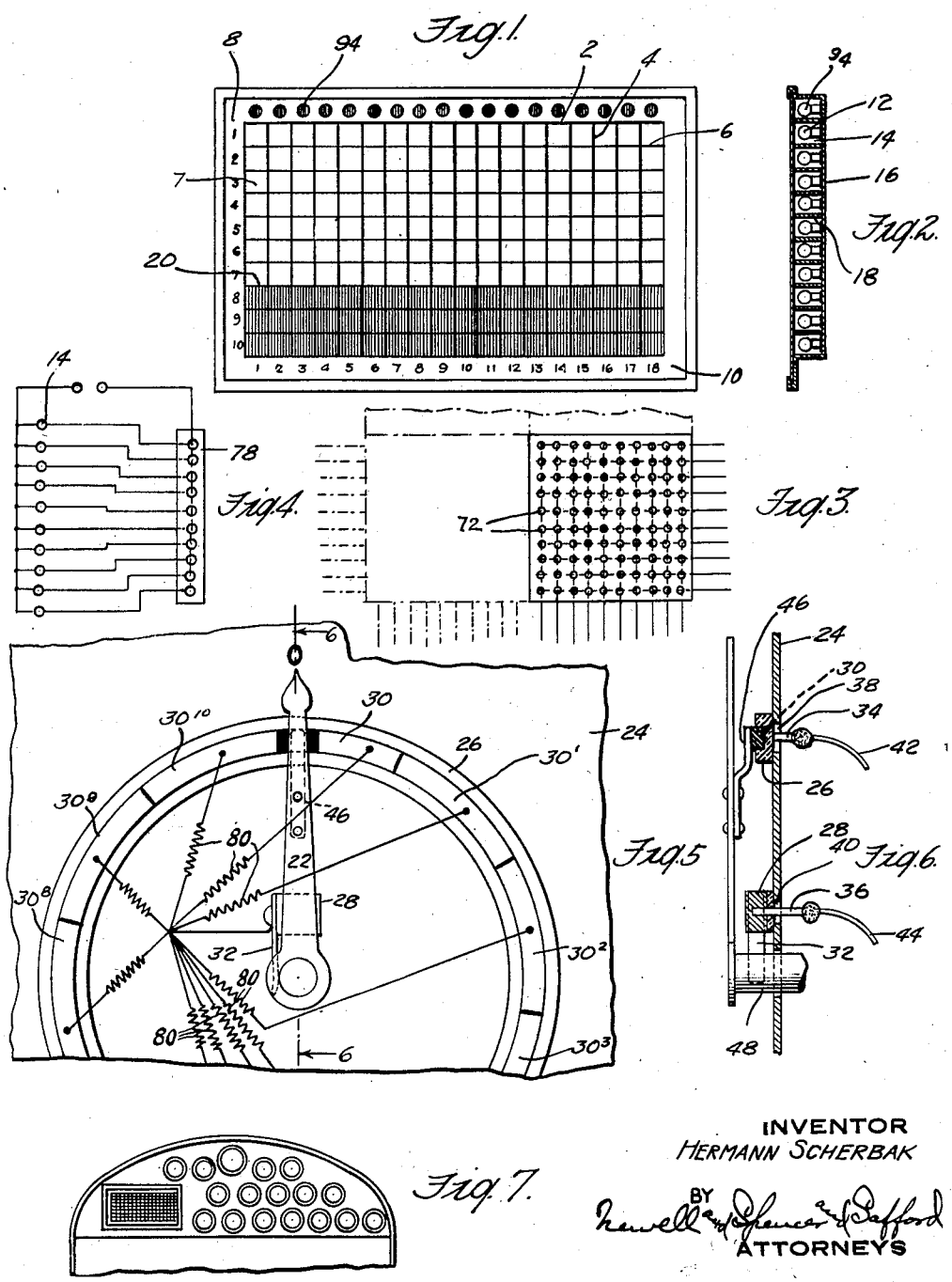
INVENTOR
HERMANN SCHERBAK

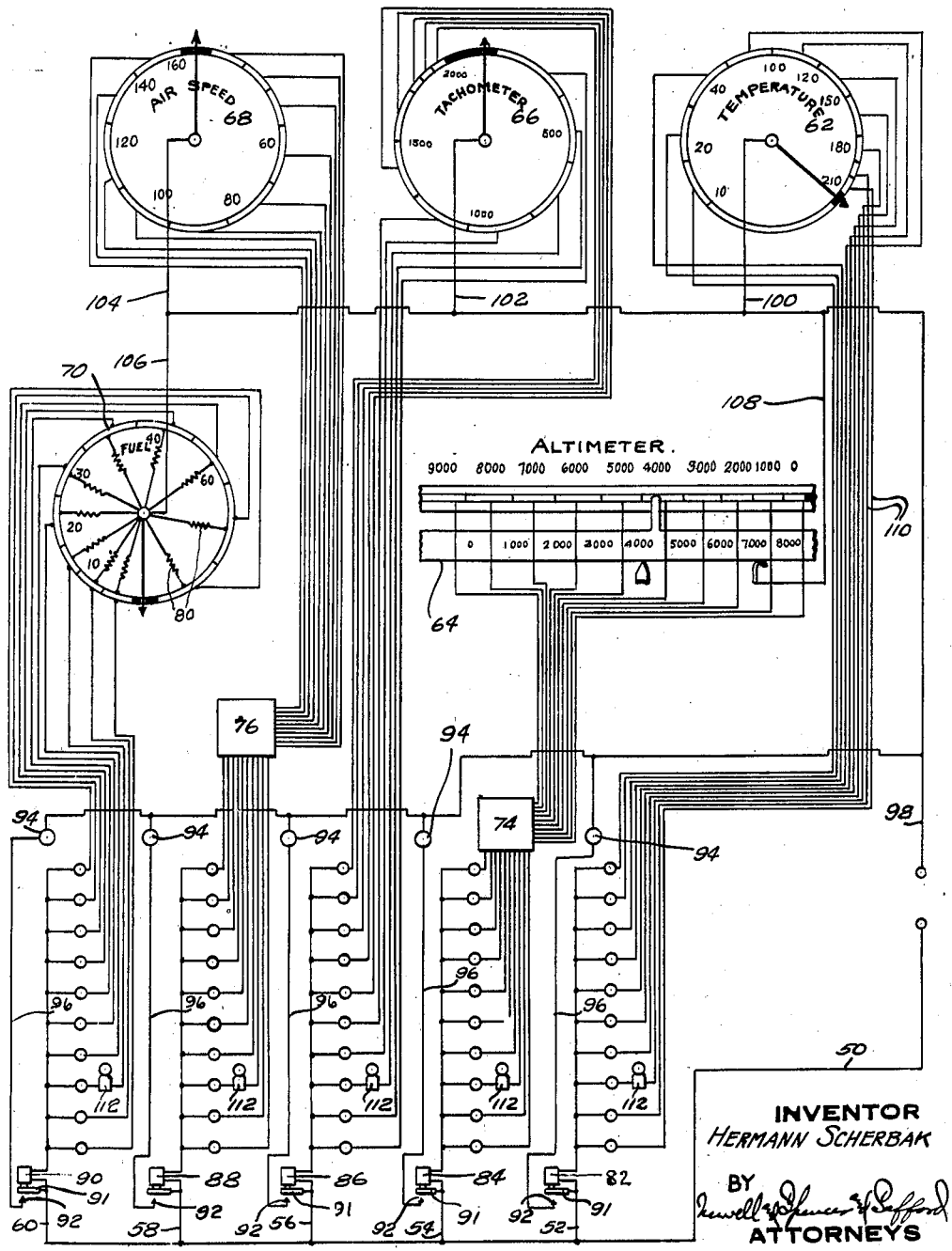

Patented Sept. 24, 1940

2,216,102

UNITED STATES PATENT OFFICE 2,216,102

MASTER INSTRUMENT

Hermann Scherbak, New York, N. Y.

Application November 10, 1936, Serial No. 110,097
Renewed May 23, 1939

6 Claims. (Cl. 177—311)

This invention relates to means for collecting, coordinating and concentrating, in such manner that they will be readily available and easily legible, the important indications from a plurality of instruments, such, for example, as the instruments to be found in the pilot's cockpit of an airplane. The invention is herein illustrated as embodied in what may be termed, for convenience, a master instrument.

In the operation and navigation of airplanes, steamships, etc., the one in charge of such operation and navigation must depend upon the indications of various instruments, both for keeping the ship or plane upon its course, for maintaining schedules, for anticipating and possibly avoiding danger, and for maintaining constant supervision of the condition of the ship or plane and of its operating means. The number of instruments for indicating various conditions to be encountered and to be considered in the operation of airplanes, for example, has increased in number to such an extent that it is practically impossible for the pilot who is operating the airplane to keep constantly acquainted with the readings of these instruments. It thus may happen, if he is operating the plane alone, that an indication of a dangerous condition by some one of the instruments may escape his attention until it is too late to correct the condition or avoid the danger. When there is a co-pilot the situation is not so apt to become serious, since the co-pilot can devote his attention to the reading of the instruments, but in the absence of a co-pilot or a special instrument observer in the cockpit, it is practically impossible for the pilot to give adequate attention to the indications of the large number of instruments now usually found in the cockpits of modern airplanes.

A general object of the present invention, therefore, is so to collect, coordinate and concentrate the indications of the various instruments which indicate the various conditions necessary to be considered in the successful operation and navigation of an airplane, a ship, etc., that the one in control of the operation and navigation of the plane or ship can perceive at a glance, or have called to his attention by warning signal, all critical conditions or conditions which are approaching the critical phase without substantially diverting his attention from his directing and operating duties.

The invention aims further so to coordinate or to translate to a common scale indications of the various instruments brought into position on a common dial for convenient inspection by the pilot or navigator, as, for example, by cross tabulation, that, in communication with the ground or shore, the readings can be transmitted by simple codes and the whole appearance of the dial of the master instrument can thus easily and quickly be reconstructed on the ground or shore.

The invention aims not only to collect, coordinate and concentrate the indications of the various instruments where they can readily be seen at a glance by the pilot or navigator, but so to arrange the indications on a common dial that there may be a common critical point or line separating the danger zone of indications from the zone in which immediate danger is not indicated.

The invention further contemplates the use, in combination with the common dial, of an audible or other signal to call the attention of the pilot or navigator to the master instrument dial when any of the instruments connected therewith has transmitted to the master instrument an indication of a critical or dangerous condition.

The invention contemplates further utilizing a part of the spaces on the master instrument dial for hand set indications, either of conditions observed by the pilot or navigator and which he may wish to compare with other conditions or which he may wish to transmit to the ground or shore, or of conditions and information such as weather forecasts which have been given to him at starting or transmitted to him after starting and which he needs to consider or to check up in the successful operation and navigation of his plane or ship.

The invention aims also to insure the maintenance of the operative connections between the various instruments and the master instrument by giving warning of interruption of said connections.

Other objects and important features of the invention will appear from the following description and claims when considered in connection with the accompany drawings in which Figure 1 is a front elevation of a master instrument embodying the present invention, showing a convenient dial arrangement;

Figure 2 is a section on the line 2—2 of Figure 1;

Figure 3 shows a switchboard or plugboard by which the means for transmitting to the master instrument and translating indications may be calibrated to compensate for changes in fundamental conditions, such as changes in temperature, normal atmospheric pressure, etc., due to the changing seasons, to changes of latitude, altitude, etc.;

Figure 4 shows a plugboard intended for the hand setting of indications on the dial of the master instrument;

Figure 5 is a front elevation of one of the associated instrument dials illustrating a simple arrangement of circuit closing means;

Figure 6 is a section on the line 6—6 of Figure 5;

Figure 7 illustrates a convenient arrangement of the master instrument on the instrument board of an airplane;

Figure 8 is a wiring diagram showing connections from five individual instruments to the master instrument.

Although the master instrument in the illustrative embodiment of the invention is shown as connected to five instruments only on the instrument panel, it will readily be understood that the particular number of instruments connected to the master instrument is immaterial so far as the invention is concerned and may be either more or less.

In the illustrative embodiment of the invention the master instrument is shown as comprising a translucent dial divided by vertical lines 4 and horizontal lines 6 into squares 7, each of which either constitutes, or has upon it, an indication, the columns of squares thus provided being preferably provided with designations such as consecutive numerals so that the location of any square on the dial 2 can be reported by reference to that one of the numerals in the vertical column 8 which indicates the horizontal column in which the particular indication square is located and by reference to that one of the numerals in the horizontal column 10 which indicates the particular vertical column in which the indication square is located. Behind each of the squares thus defined on the instrument panel or board is located a small electric lamp 12 located in a separate compartment 14 in a housing 16 divided by partitions 18 into as many compartments as there are squares on the master instrument dial.

Each of the vertical columns of squares on the master instrument dial 2 may represent the indications from an instrument suitably connected thereto or it may represent the indications, produced by hand setting, of various kinds of information which the operator wishes either to correlate with the information provided by the instruments or with observed conditions when reporting at intervals to a ground or shore station. When an instrument is connected to the master instrument it will indicate in one of the vertical columns, which is numbered in accordance with the numbering shown in the horizontal column 10, essential readings of the instrument by causing the illumination of one of the squares in the vertical column starting from the top and progressing downwardly, the indications from the various instruments being correlated to a common critical line 20. The illustrated master instrument dial 2 is shown as provided with squares for ten indications in each vertical column, but it will be understood, of course, that for some instruments it will not be necessary to make connections sufficient to indicate ten different indications of the instrument, only three or four important indications of some instruments being of sufficient importance to transmit to the master instrument. If desired, however, each instrument may be so connected to the master instrument illustrated that ten different positions of its indicator may be transmitted to the master instrument.

Any suitable means may be provided for closing a circuit to the particular lamp 12 in its compartment 14 which is to represent a particular indication of the instrument connected with the vertical column in which the lamp is located, the means most suitable for this purpose depending, of course, somewhat upon the nature of the indicating means of the instrument to be connected to the master instrument. In Figures 5 and 6 are illustrated suitable connections for an instrument having an indicator hand 22 traveling over a circular dial 24. As shown in Figure 6, insulating blocks 26 and 28 are mounted upon the face of the dial 24 and carry respectively contacts 30 and 32 connected by rods 34 and 36, extending through openings 38 and 40 in the dial 24, to wires 42 and 44 connected to the master instrument in a manner hereinafter to be described. It will be noted that the contact 30 is arranged to be engaged by a spring wiper 46 carried by the hand 22 of the instrument and that the contact 32, which is itself constructed in the form of a spring wiper, engages the shaft 48 of the instrument on which the hand 22 is mounted, the shaft 48 being connected or grounded to one side of the current supply.

Referring to the wiring diagram in Figure 8, one side of the various instrument circuits is indicated at 50, the side 50 having branches 52, 54, 56, 58 and 60 in parallel to the instruments 62, 64, 66, 68 and 70, respectively. For those instruments, the critical indications of which vary with changes in latitude, altitude or climatic conditions, such as changes in seasons, it is desirable that convenient means be provided for effecting a re-calibration with respect to the indications on the master instrument in order to compensate for such changes without disturbing the individual instrument contacts. A convenient way of doing this is to provide a switchboard or plugboard, such as shown in Figure 3, having crossing terminals respectively from an instrument and from the indicator lamps for a column, these terminals being connectible at plug holes 72. As herein shown, switchboards 74 and 76 are interposed in the connections to the altitude meter 64 and to the air speed indicator 68, respectively. By adjusting the connections on the plug board or switchboard which is located in the transmission connections between an instrument and its column of indications on the dial, the instrument can readily be calibrated with respect to its relationship to the dial so that its critical indication on the dial will be the same for different basic conditions. From an inspection of Figure 3 it will be seen that, by inserting a plug in the opening 72 where the line from any lamp in the column corresponding to the instrument with which the plugboard or switchboard is associated crosses a line from the instrument contact which it is desired to have represented by said light on the master instrument, any one of the ten lights in the column corresponding to the instrument can be connected to any one of the contacts on the instrument.

As hereinabove suggested, there is preferably provided, in addition to the columns of indications on the dial 2 which are connected to various instruments, other columns of indications for hand set designation of the indications. These indications designated by hand setting may be at one end of the dial 2 and the lighting of the lamps 14 for the particular column of indications may be effected by means of a plugboard or switchboard 78, there being as many of these plugboards or switchboards 78 as there are columns of hand set indications.

It is usually desirable, in apparatus intended to indicate critical situations, that the circuits be constantly supervised to show that they are not broken and also to signal when there is a break, such supervision, of course, being usually restricted to the more important connections, especially where weight is a factor, as in a master instrument for airplanes.

In the illustrative embodiment of the invention automatic supervision of the circuits is suggested for the connections between the source of current supply to the master instrument on the one hand and to the individual instrument on the other hand. This supervision does not necessarily extend to all of the individual circuits to the various lamps of the master instrument which should, therefore, be so protected as to be not liable to get out of order. The illustrative supervisory means is of the closed circuit type in which the current is kept by resistance below operating level but yet at a sufficiently high level to maintain a magnetically controlled circuit closer in its open circuit condition in an auxiliary alarm circuit.

In Figure 5 of the drawings the arrangement of the resistance with respect to the contacts 30, 30', 30², 30³, 30⁴, etc. is illustrated on a large scale and in Figure 8 this same illustration is added to the fuel indicating instrument to show the relation of the resistance to the remainder of the wiring. The resistance and the wiring to the contacts is not shown on the other instruments, to avoid confusion, but it will be understood that it may constitute a part of the wiring of any one of the instruments and that where it is so used and not shown on Figure 8 it may be assumed to be, where it actually is in practice, behind the instrument dial.

As herein shown, each of the instruments may be provided with resistance 80 in the connections between the contact 32 engaging the shaft 48 and the indication-determining contacts 30, 30', 30², 30³, 30⁴, etc., so that current normally flows through these contacts and through the resistance 80 but is held down by the resistance 80 to a level below that sufficient to light one of the lamps 14. When the indicator hand 22 moves to bring its wiper 46 into engagement with any one of the contacts 30, 30', 30², 30³, 30⁴, etc., it short circuits the resistance 80 in the connection between the contact 32 and the particular indication-determining contact engaged and thus brings the current for that particular circuit up to operating level.

The resistance 80 holds the current in the circuit running to the particular instrument below operating level but at a level sufficiently high to energize the relay magnets 82, 84, 86, 88 or 90 in that circuit sufficiently to maintain its armature 91 away from its associated contact 92, therefore maintaining in open condition an auxiliary circuit through a signal lamp 94, said auxiliary circuit comprising a shunt 96 extending from the ground side of the circuit to each of the various instruments to the main lead 98 from which branch the connections 100, 102, 104, 106 and 108 to the common indicator contact for each instrument. There will be as many shunt circuits 96 and signal lamps 94 as there are instruments, so that the main circuit to each instrument is automatically supervised. The lamps 94 preferably show on the dial of the master instrument above the respective vertical columns so that whenever a lamp 94, preferably a red lamp or a lamp shining through a red screen, is illuminated the pilot will know that there has been some interruption in the connection between the master instrument and the instrument, the indications of which are to be translated into the indications in the particular column.

As hereinabove pointed out, such calibration is preferably made between the various instruments and the master instrument that the indications on the master instrument are related to a common critical line 20, this line 20 indicating the boundary between zones of comparative safety and the danger zone, and preferably the indications below the line 20 will be shown in red as, for example, by coloring red that area of the translucent dial which lies below the critical index line 20.

From the foregoing description the operation of the invention will readily be understood.

Between each of the instruments 62, 64, 66, 68 and 70 and the lamps in the vertical column into which the indications of the instrument are to be translated there will be as many connecting wires 42 as there are contacts 30, 30', etc. on the instrument dial for indications of the said instrument to be transmitted to and translated into indications on the master instrument. Each of the instruments illustrated is shown as having ten connecting wires between ten indication contacts on the instrument and ten corresponding lamps in its appropriate column on the master instrument dial. In each of the circuits made by those wires 42 which go to the lamps in the first squares below the critical line 20 there is an alarm bell 112, so that when any instrument indicates a critical condition the operator's attention will be called to the master instrument dial by the ringing of the alarm bell 112.

As the indicator hand 22 moves over the successive contacts 30, 30', 30², 30³, etc., on the instrument dial it will cause the lighting in succession of the lamps, beginning with the horizontal row "1", down the particular vertical column associated with the instrument, only one lamp being illuminated at a time in each column. Thus the pilot or operator can, by a mere glance at the master instrument dial, tell the reading of any instrument and also note whether or not the readings are approaching the critical index line 20. Moreover, when communicating with the ground or shore, the pilot or operator can, by simply reading the number of the horizontal row and the number of the vertical column in which any particular lamp is illuminated, give the reading to be inserted in a chart having thereon a dial corresponding to the master instrument dial. Thus, by simple code communication, requiring a relatively short time for transmission, the readings in every column on the master dial can be reported for insertion in their proper position in corresponding columns on the ground chart and the appearance of the master dial thus quickly reconstructed on the ground.

Of course, if desired, any suitable recording means may be associated with the master instrument itself, such recording means, in itself, being no part of the present invention, but it is usually preferable to limit as far as possible the weight of an instrument of this character, where it is to be used in airplane operation and control. Ordinarily, therefore, such recording means will not be connected to the master instrument when it is intended for airplane use. It is also, of course, possible to associate with the master instrument instruments which receive communications from the ground of a nature which can be translated in any suitable way to indications on the master instrument. Instruments capable of receiving and recording or relaying communications are in existence and therefore constitute no part of the present invention, although the present invention can, of course, readily be used with instruments of this character as well as with those which indicate conditions in the immediate vicinity of the plane or ship itself.

Although in the foregoing statement of invention and description emphasis has been placed upon the utility of the master instrument of this invention in connection with the operation and navigation of airplanes, steamships, etc., it will be understood that it is not restricted to such uses, nor is it restricted to use in connection with transports of any character, whether on the water, in the air or on land.

What is claimed as new is:

1. An instrument of the class described comprising, in combination, a dial having thereon groups of indications for a plurality of instruments to be associated therewith which register in various ways a variety of conditions to be observed, indication designating means for each group operable from its associated instrument, said groups of indications being so coordinated on said dial that at least the critical indications on said dial for the respective instruments are located in a common dial zone, and phase coordinating connections between said indication designating means and the several instruments the readings of which are to be translated into indications on said dial in said common dial zone.

2. In apparatus of the class described, means for translating indications received from a plurality of instruments registering in various ways a variety of conditions to be observed into indications having common denominators upon a common dial, said means comprising indication transmitting means adapted to be connected to the respective instruments and a dial having a series of columns of indications into which the transmitted indications of the respective instruments are to be translated, the indications of successive columns being arranged in rows transverse thereto and the transmitting means being so calibrated in respect to the phase differences of the respective instruments that the indications of the various instruments are translated into indications on said dial including at least a common row of critical indications for the respective instruments, and indication designating means for the respective sets of transmitted indications operated by said transmitting means.

3. In an instrument of the class described, a dial having a plurality of columns of indications thereon arranged in rows transverse to said columns, individual indication designating means for the indications of each column, means for so connecting the individual designating means of the respective columns to instruments registering in various ways a variety of conditions to be observed that the indications of the associated instruments are translated into indications in the corresponding columns on said dial so coordinated that the initial critical indications of the several instruments are translated into indications in a common row on said dial.

4. An instrument of the class described comprising, in combination, a dial having thereon groups of indications for a plurality of instruments to be associated therewith which register in various ways a variety of conditions to be observed, indication designating means for each group operable from its associated instrument, said groups of indications being so coordinated on said dial that the critical indications on said dial for the respective instruments are located in common dial zones, and phase coordinating connections between said indication designating means and the several instruments the readings of which are to be translated into indications on said dial in said common dial zones, the connections between an associated instrument and the dial of the master instrument having provision for convenient phase shifting adjustment to insure calibration of the master instrument dial readings of said instrument connected thereto to changes in fundamental conditions.

5. An instrument of the class described having, in combination, a panel provided with rows of indicators arranged in columns transverse to the rows, instruments designed to indicate in various ways a variety of conditions to be observed associated with the respective columns of indicators on said panel, each of said instruments being provided with indicator controlling means for effecting both an indication at the instrument and an indication in its associated column on the panel, and means whereby energization of the panel indicators is so shifted in their phase relations to the respective instruments as to bring critical indications of the respective instruments into a predetermined row of dial indicators and more dangerous indications into at least one other row of dial indicators.

6. Means for coordinating the registrations of a plurality of instruments responsive respectively to a plurality of kinds of conditions, said means comprising a panel having thereon columns of indications for the respective condition responsive instruments and indication designating means adapted to be actuated from the respective condition responsive instruments for designating the appropriate indications in the respective columns, the connections between the responsive condition instruments and the respective panel column indicators providing for location of critical indications for the respective condition responsive instruments in common zones across said columns.

HERMANN SCHERBAK.